United States Patent Office 2,983,695
Patented May 9, 1961

2,983,695
MODIFIED POLYESTER RESINS DERIVED FROM (1) ETHYLENICALLY UNSATURATED ALIPHATIC DICARBOXYLIC ACIDS AND POLYHYDRIC ALCOHOLS ESTERIFIED WITH AT LEAST ONE SUBSTANTIALLY PURE FATTY ACID OF 6 TO 12 CARBON ATOMS AND THEN (2) CROSS-LINKED WITH A VINYL MONOMER

Georges Wetroff, Le Thillay, and Isidor Raitzyn, Paris, France, assignors to Pechiney Compagnie de Produits Chimiques et Electrometallurgiques, Paris, France, a corporation of France No Drawing. Filed Aug. 12, 1955, Ser. No. 528,128
Claims priority, application France Sept. 14, 1954
12 Claims. (Cl. 260—22)

This invention relates to modified and improved procedures for the production of alkyd resins and to the improved products of such procedures.

It is known that dicarboxylic acids, or anhydrides thereof, react with dialcohols by hetero-condensation mechanisms, with the formation of linear compounds, which are suitable as thermoplastic resins.

It is known also, for example, from works by Saunders (British Patent 500,547, filed on July 8, 1937) that thermosetting resins may be obtained by replacing in said reaction a portion of the aromatic dicarboxylic or saturated aliphatic acids with ethylenically unsaturated divalent acids. Maleic and fumaric as well as itaconic, mesaconic acids, and some of their addition products with dienic compounds such as hexachloro-endomethylene-tetrahydrophthalic acid are suitable therefor.

The new properties of these resins are due to exceptional reaction of ethylenically unsaturated bonds in the formed chains. The hetero-condensation of dicarboxylic acid and dialcohol is carried out by —COOH and —OH groups of the 2 components without intervention of the double bond of each acid molecule. If unsaturated chains formed after this condensation are contacted with an unsaturated compound, for example, styrene, in the presence of suitable catalyst, a cross-linked molecule is obtained by a bridging phenomenon.

However, a parasite or side reaction is almost always produced when such condensations take place. Certain unsaturated units are reacting together by a mutual saturation between the chains.

Instead of the desired chains of the type:

. . . OOC—CH=CH—COO(CH$_2$)$_n$—
OOC—CH=CH—COO . . .

molecular structures of the type:

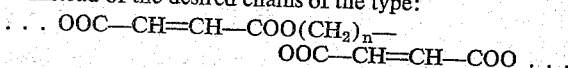
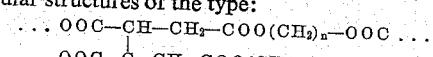

are obtained by a reaction known as additive polymerization.

Due to this parasite reaction, the number of double bonds free for the final reaction with cross-linking is decreased and the structure formerly forecast cannot be obtained since a network with a random structure is existing already, thus hindering subsequent cross-linking. Under such circumstances the final products are insufficiently and irregularly cross-linked and are similar in this respect to badly vulcanized rubber and do not possess required qualities.

On the other hand, products obtained by hetero-condensation of diols and ethylenically unsaturated dicarboxylic acids are generally lacking in desired flexibility. Due to this property, their suitability for use in lacquers, varnishes and all uses where a good impact strength is required becomes limited. In the generally used association of alkyds with glass-fabrics, the rigidity of fibers is substantially overcome by fully modifying the molecular structure and composition of resins. The above listed disadvantages were, for a long time, attempted to be avoided, by adding to the reaction mass drying or semi-drying vegetable oils or non-drying modified oils, such as dehydrated castor oil. The oils most frequently used to improve flexibility are: linseed oil, cottonseed oil, soyabean oil, China-wood oil, sunflower oil and oleic acid and lineoleic linolenic acids either free or as monoglycerides. By the introduction of such oils, compatibility, solubility and flexibility of the resin products are modified, but the resin products are still lacking in the desired properties for a great number of applications.

Moreover, the fixation of the long fatty unsaturated chains in the polyester molecule causes copolymerization, due to the presence of the double bond of the fatty acid. This copolymerization begins to occur with the polycondensation, even though care is taken to prepare the unsaturated fatty acid monoglyceride in advance and to operate thereafter the condensation of the monoglyceride with ethylenically unsaturated diacid. This manner of operating, as recommended by several authors, does not materially hinder reactions taking place between the double bonds of the resin chain and those of the fatty acids in a random manner at the same time that the heterocondensation takes place. Therefore, the only heterocondensation which can be achieved as forecast result, is partially carried out in a first step, while afterwards, in a second step, the cross-linking alone takes place, under well determined conditions.

In such a reaction a great part of the ethylenically unsaturated double bonds disappear by mutual saturation with those of unsaturated fatty acid. Such products are not well adapted to being cross-linked by a monomer such as styrene. The reaction mass often gels, when heating, a long time before the end of hetero polycondensation is complete. In a number of cases the copolymerization is carried out at such a rate that a gelatinous mass is obtained, which is only slightly compatible with the monomer before a noticeable portion of the diol is esterified. Under such circumstances the end product has too high an acidity number and too great a sensitivity to water due to the presence of unesterified hydroxy groups.

Drying oils, which are very difficultly purified, are used in the usual way to prepare these resins. They are generally used as their naturally occurring state and as the monoglyceride of the corresponding acid obtained by partially saponifying of the oil by heating. (For example, at 240–250° in the presence of litharge.) In such procedures the original impurities remain in the mixture, and during the treatment, some others may be formed, such as acrolein, or inner hydroxy-ether, for example,

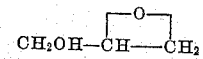

polyglycerols, etc. Such substances interfere with the smooth polymerization procedure, with the cross-linking ability of vinyls, and with mechanical and optical properties of obtained alkyds.

The principal object of the present invention is to overcome the disadvantages of the discussed prior art procedures and to provide alkyd, or polyester resins possessing superior properties. It is a more specific objective of this invention to provide modified alkyds resins of controlled quality, containing fatty chains, but with particular, regular and well-defined molecular structure possessing required flexibility and mechanical resistance properties and optical transparency characteristics.

The foregoing and other advantageous results can be obtained by condensing and esterifying ethylenically unsaturated acids, such as those heretofore found useful in the production of polyester resins, with a polyhydric alcohol containing two free hydroxy radicals in its molecule and at least one hydroxy radical esterified with a saturated aliphatic acid of intermediate chain length, namely, such an acid containing 6 to 12 carbon atoms. Experiments have shown that the presence of the saturated fatty acid chain of 6 to 12 carbon hinders the mutual or reciprocal saturation of the double bond in the diacid. It seems apparent that a steric hindrance effect is created by the presence of the saturated aliphatic ester group which is interposed between the chains and acts as a protecting shield against the chains being united to one another. The effect is illustrated in the following scheme:

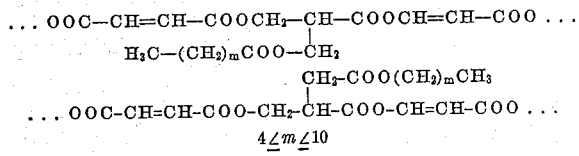

$4 \leq m \leq 10$

Thus it will be seen the steric hindrance effect orients the reaction towards hetero condensation alone thereby excluding additive polymerization and copolymerization.

It was not obvious that fatty chains thus attached to a hydroxyl function of the diol should act as double bond protectors and should allow the reaction to be oriented towards complete polycondensation by inhibiting additive polymerization. For example, too short a chain has proven an insufficient shield and too long a chain has led to too soft resins.

The instant process is quite different from the one used when introducing into molecule unsaturated fatty acids. Accordingly to the present invention, the introduction of supplementary double bonds, which are capable of cooperating in cross-linking by reacting on double bonds of the acid, is avoided. Also, any reaction of double bonds of the diacid during the polyesterification step is avoided. Thus saturated esterifying acids are required.

Moreover, it has been shown by experiment that it is necessary to use fairly pure esters alcohols if optimum results are to be achieved in this invention. Otherwise unsaturated substances are often introduced into reaction medium, such as aldehydes or inner ethers, which are capable of opening and readily reacting with double bonds, thereby favoring copolymerizations which it is a purpose of this invention to avoid. Also disadvantageous coloring substance and odors are introduced by such impurities, as well as a poor susceptibility to peroxide which are used advantageously if a subsequent cross-linking step is desired. For example, if glycerol monoheptanoate is used as esterification agent, the raw monoglyceride is subjected to an oxygen stream containing 3–7% ozone and then is rectified under a high vacuum in order to obtain a pure product. This purification process is only shown as a preferred example and the invention is not to be considered limited to the utilization of such a step.

By the instant process, the condensation of ethylenically unsaturated diacid with the polyhydric alcohol is achieved without a noticeable modification of unsaturation number. The final cross-linking of obtained alkyd resin proceeds afterwards under the exact conditions selected for the said operation by adding the required amount of unsaturated monomer, for example, styrene.

The invention is illustrated further by the following examples:

Example 1

Ninety-eight g. pure distilled maleic anhydride and 204 g. glycerol monoheptanoate are heated at a temperature of 160° C. in a round bottomed flask fitted with a mechanical stirrer and a reflux cooler which has passing therethrough a stream of an inert gas, for example, argon. The glycerol monoheptanoate was fractionated under a vacuum of 0.3 mm. Hg (B.P. 145° C. under 0.3 mm. Hg, $n_D^{20}$ 1.4542, $D_{20}$=1.062). Water formed during the reaction is swept away by the argon stream and was condensed and weighed. Moreover, the reaction is followed by a determination of the acidity and unsaturation indexes. As the reaction mass thickens its viscosity is determined. While the acid number decreased markedly during the reaction, the unsaturation number or index decreased only slightly.

After heating the reaction mass 5 hours, it is cooled and 25%, by weight, of styrene is mixed with it. The resin is stabilized by adding 0.05% hydroquinone in order to maintain a good conservation. A resin is thus obtained, almost uncolored, which is fully miscible and compatible with styrene and is readily hardened when heated at 120° C. in the presence of 5% benzoyl peroxide.

It is hardened also in two hours at room temperature (20° C.) under action of 5% benzoyl peroxide (dissolved in 50% tricresylphosphate) in the presence of 0.05% of an appropriate initiator such as cobalt naphthenate. The resin formed with the styrene is especially well adapted to be used conjointly with glass fibers and may be used, for example, to form small hard and flexible plates or slabs.

Example 2

When an alkyd resin is prepared from maleic anhydride and glycerol monoacetate under similar conditions to those used in Example 1, the resin shows a tendency to gel and to be difficultly dissolved in styrene. A rapid decline in the double bond number is shown by unsaturation number measures. Moreover, formation of low molecular weight polymers, sticky and difficultly hardened on heating, is observed. Esterification seems to proceed with ring closure instead of giving linear chains, according to the following structure:

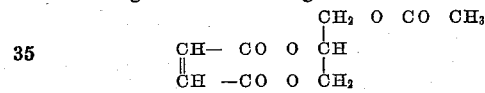

Units thus formed are joined together with a disappearance of double bonds.

When glycerol monoacetate is replaced by a diol such as ethylene glycol, disadvantages of an equal scope appear. The resin obtained is hard and brittle and crumbles with temperature changes.

Example 3

Ninety-eight g. maleic anhydride, 204 g. glycerol monoheptanoate (purified by ozone and fractionated in vacuo) and 300 g. xylene, used to remove water when formed, are heated in a round bottomed flask fitted with a stirrer and an overhead cooler provided with a separator and a stop cock.

A more regular and methodical removal of water formed during polymerization is obtained by this technique and the condensation can take place at lower temperatures (130–140° C.), thereby providing uncolored resins.

As in Example 1, polymerization is avoided and resins with well defined structure and required mechanical properties are obtained by addition of styrene with its resultant cross-linking. The styrene is completely compatible with the first formed resin.

Example 4

A distilled pure maleic anhydride molecule and a glycerol monopelargonate, purified by ozone and rectified under a vacuum of 0.3 mm. Hg, are heated in a round bottomed flask which is provided with a mechanical stirrer and a reflux cooler and which has an argon stream passing therethrough. The temperature is maintained at 170° C. and water formed is removed by the argon stream, thereby controlling the progress of the polycondensation process. The removed water is condensed and weighed.

After three hours heating, the reaction mass is permitted to cool and is mixed with 25%, by weight, of styrene.

The mixture obtained is readily hardened at about 120° C. in the presence of 3% benzoyl peroxide. It is exceptionally well adapted for the production of resin bodies reinforced with glass fibers.

*Example 5*

By replacing maleic anhydride with stoichiometric amounts of hexachloro endo methylene tetrahydrophthalic acid, obtained from hexachlorocyclopentadiene by Diels-Alder's method in accordance with the following formula:

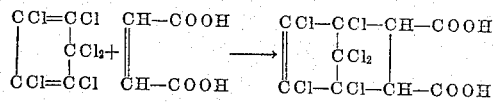

alkyd or polyester resins are obtained by condensation with glycerol monoheptanoate (purified by ozone and fractioned in vacuo) which are compatible with styrene. Such resins are free of polymerization products and show, after hardening when combined with glass fibers, required transparency and mechanical strength properties.

The foregoing examples have related to alkyd or polyester resins obtained by condensing maleic acid, or hexachloro endo methylene tetrahydrophthalic acid, with glycerol esterified with a saturated fatty acid of 6 to 12 carbon atoms and to such resins modified or cross-linked by being treated with a monomeric vinyl compound typified by styrene. It will be understood, however, that other known alkyd or polyester resin forming unsaturated diacids, such as fumaric, itaconic and mesaconic acids and their adducts derived from diene compounds, as typified by the hexachloro endo methylene tetrahydrophthalic acid, may be substituted for the disclosed acids. Likewise known resin forming polyhydric alcohols having two free hydroxy radicals, other than glycerol, may be used in the process of the invention provided such alcohols have at least one hydroxy radical esterified by a saturated monovalent aliphatic carboxylic acid of 6 to 12 carbon atoms. Also known unsaturated monomers may be used conjointly with appropriate catalyst to cross-link the first formed polyester resin and thereby obtain an infusible resin.

Additionally, it will be understood that the temperatures at which the polyesters are formed in the special examples are mere exemplifications of operable temperatures for they may be formed at temperatures between 100 and 250° C. although temperatures of about 150 to 170° C. are usually adequate. Even lower temperatures may be used satisfactorily when operating in the presence of a liquid which removes the water formed during the esterification condensation, especially when using liquids, such as xylene, which form azeotropic mixtures with water and may be distilled at such lower temperatures.

Thus the invention is not limited to such details as included in the illustrative specific example for it is to be understood that various modifications can be made by those skilled in the resin art without departing from the scope of the invention as defined in the appended claims.

What is claimed is:

1. A modified and cross-linked polyester resin obtained by (1) forming a polyester resin by first condensing (a) an ethylenically unsaturated aliphatic dicarboxylic acid with (b) a preformed monoglyceride ester of a substantially pure fatty acid of 6 to 12 carbon atoms so that at least one hydroxy radical is esterified with the fatty acids and then (2) catalytically cross-linking the formed polyester resin with a vinyl monomer.

2. A modified and cross-linked polyester resin obtained by (1) forming a polyester resin by first condensing (a) an ethylenically unsaturated aliphatic dicarboxylic acid with (b) a preformed monoglyceride of substantially pure saturated fatty acids of 6 to 12 carbon atoms and then (2) cross-linking the formed polyester resin with styrene.

3. A modified and cross-linked polyester resin obtained by (1) forming a polyester resin by first condensing (a) an ethylenically unsaturated aliphatic dicarboxylic acid with (b) a preformed monoglyceride ester of a substantially pure fatty acid of 6 to 12 carbon atoms so that at least one hydroxy radical is esterified with the fatty acids and then (2) catalytically cross-linking the formed polyester resin with a vinyl monomer.

4. A modified and cross-linked polyester resin obtained by (1) forming a polyester resin by first condensing (a) an ethylenically unsaturated aliphatic dicarboxylic acid with (b) a preformed monoglyceride ester of a substantially pure fatty acid of 6 to 12 carbon atoms so that at least one hydroxy radical is esterified with the fatty acids and then (2) catalytically cross-linking the formed polyester resin with styrene.

5. A process for producing novel modified and cross-linked polyester resins comprising first esterifying glycerol with a substantially pure saturated fatty acid of 6 to 12 carbon atoms in a quantity which esterifies only one hydroxy radical; second forming a polyester by condensing the formed fatty acid ester with an ethylenically unsaturated aliphatic dicarboxylic acid; and then cross-linking the formed polyester by catalytically reacting it with a vinyl monomer.

6. The process of claim 5 in which the polyester is formed at temperature between about 100° C. and 150° C. and the water of reaction is removed by a liquid hydrocarbon forming an azeotropic mixture with water.

7. A modified and cross-linked polyester resin obtained by (1) forming a polyester resin by first condensing (a) maleic acid with (b) a preformed monoglyceride of substantially pure saturated fatty acids of 6 to 12 carbon atoms and then (2) cross-linking the formed polyester resin with styrene.

8. A modified and cross-linked polyester resin obtained by (1) forming a polyester resin by first condensing (a) maleic acid and (b) a substantially pure glyceryl monoheptanoate and then (2) cross-linking the formed polyester resin with styrene.

9. A modified and cross-linked polyester resin obtained by (1) forming a polyester resin by first condensing (a) maleic acid and (b) a substantially pure glyceryl monopelargonate and then (2) cross-linking the formed polyester resin with styrene.

10. A modified and cross-linked polyester resin obtained by (1) forming a polyester resin by first condensing (a) fumaric acid with (b) a preformed monoglyceride of a substantially pure saturated fatty acid of 6 to 12 carbon atoms and then (2) cross-linking the formed polyester resin with styrene.

11. A modified and cross-linked polyester resin obtained by (1) forming a polyester resin by first condensing (a) itaconic acid with (b) a preformed monoglyceride of a substanitally pure saturated fatty acid of 6 to 12 carbon atoms and then (2) cross-linking the formed polyester resin with styrene.

12. A modified and cross-linked polyester resin obtained by (1) forming a polyester resin by first condensing (a) mesaconic acid with (b) a preformed monoglyceride of a substantially pure saturated fatty acid of 6 to 12 carbon atoms and then (2) cross-linking the formed polyester resin with styrene.

References Cited in the file of this patent

UNITED STATES PATENTS

| | | |
|---|---|---|
| 2,204,009 | Bruson | June 11, 1940 |
| 2,392,710 | Wakeford et al. | Jan. 8, 1946 |
| 2,479,836 | Hoback et al. | Aug. 23, 1949 |
| 2,590,911 | Wittcoff | Apr. 1, 1952 |
| 2,689,224 | Sirianni et al. | Sept. 14, 1954 |
| 2,850,469 | Christenson | Sept. 2, 1958 |

FOREIGN PATENTS

| | | |
|---|---|---|
| 630,924 | Great Britain | Oct. 24, 1949 |